United States Patent [19]

Hinn

[11] Patent Number: 4,587,566
[45] Date of Patent: May 6, 1986

[54] AUTOMATIC KINESCOPE BIAS CONTROL SYSTEM WITH MODIFIED INITIAL OPERATION

[75] Inventor: Werner Hinn, Zollikerberg, Switzerland

[73] Assignee: RCA Corporation, Princeton, N.J.

[21] Appl. No.: 608,353

[22] Filed: May 9, 1984

[51] Int. Cl.$^4$ .................... H04N 5/68; H04N 9/20; H04N 9/72

[52] U.S. Cl. .................... 358/242; 358/29; 358/34; 358/65

[58] Field of Search ............ 358/64, 65, 29, 33, 358/34, 66, 242, 243

[56] References Cited

U.S. PATENT DOCUMENTS 4,263,622  4/1981  Hinn ..................... 358/242
4,277,798  7/1981  Hinn ..................... 358/34
4,450,476  5/1984  Tallant .................. 358/74

Primary Examiner—James J. Groody
Assistant Examiner—Randall S. Svihla
Attorney, Agent, or Firm—P. J. Rasmussen; P. M. Emanuel; R. H. Kurdyla

[57] ABSTRACT

In a video signal processing system such as a video monitor including an automatic kinescope bias (AKB) control system, the time required for the AKB system to initially achieve correct kinescope biasing is reduced with respect to a given interval of time beginning when the video processing system is initially energized. This is accomplished by reducing a storage time constant of the AKB system during the given interval, and by precharging a storage element of the AKB system during the given interval.

8 Claims, 3 Drawing Figures

AUTOMATIC KINESCOPE BIAS CONTROL SYSTEM WITH MODIFIED INITIAL OPERATION

This invention concerns a video signal processing and display system including apparatus for automatically controlling the bias of an associated image displaying device such as a kinescope. In particular, this invention concerns such a system wherein the bias controlling operation of the automatic bias control apparatus is accelerated during an initial operating interval beginning when the video system is initially energized.

Video signal processing and display systems such as television receivers and video monitors sometimes employ an automatic kinescope bias (AKB) control system for automatically establishing proper black current levels for each electron gun of an associated image displaying kinescope. As a result of this operation, displayed picture colors and gray scale tracking of the kinescope are prevented from being adversely affected by variations of kinescope bias from a desired level due to aging and temperature effects among other factors. Various types of AKB systems are known, such as described in my U.S. Pat. Nos. 4,263,622 and 4,277,798 for example.

The kinescope beam current is approximately equal to the sum of the cathode currents conducted by each of the kinescope electron guns. An AKB system typically operates during image blanking intervals when the kinescope conducts a small black level representative current. This current is sensed by the AKB system to generate a control signal representing the difference between the sensed black current level and a desired black current level, and the control signal is applied to video signal processing circuits with a sense for reducing the difference.

When a television receiver or video monitor system is initially energized, the kinescope cathodes are cold and consequently conduct very little or no current. The kinescope electron guns warm up to a normal operating temperature several seconds after the system is initially energized. This time interval varies from one kinescope type to another, but typically is on the order of about 10 to 15 seconds, after which the kinescope electron guns come into conduction rapidly. An AKB system in a consumer television receiver usually requires about 2 to 5 seconds to achieve correct kinescope bias after the end of the kinescope warm-up interval.

In video systems where it is desired to greatly reduce the effects of low frequency biasing noise, the AKB system typically exhibits a long storage time constant. The effects of low frequency biasing noise are manifested by a random fluctuation of the video signal black level at the kinescope cathodes, caused by low frequency electrical noise appearing anywhere in the AKB control loop. The visible effect of such low frequency biasing noise is a faint "flutter" in dark areas of a displayed image. Thus an AKB system in a professional video monitor commonly exhibits a storage time constant that is significantly longer than that typically exhibited by an AKB system in a consumer television receiver. In either case, the AKB storage time constant is usually related to the values of an RC network including a storage capacitor which stores sampled information representative of the bias condition of a given kinescope electron gun.

The overall AKB system time constant is a function of factors including the values of the storage capacitor and associated charging resistances, the rate at which sampling occurs, and the duration of the sampling intervals. Overall time constants of approximately six seconds are often associated with video monitors for example, although most consumer television receivers typically exhibit an overall AKB time constant at least ten times smaller. However, it has been observed that, from the moment that a video processing system such as a video monitor with a long storage time constant is initially energized, the AKB system can take as long as twenty to thirty seconds to bring the kinescope cathode bias voltage to within one volt of the cathode bias voltage corresponding to a desired kinescope black current condition. This amount of delay is undesirable. In addition, during this interval before proper kinescope bias is established, a displayed picture can exhibit distorted colors, with the colors often changing as the kinescope bias is gradually adjusted to the correct value through the action of the AKB system.

Accordingly, there is disclosed herein an AKB system in accordance with the principles of the present invention wherein the time required for the AKB system to initially achieve correct kinescope biasing is reduced with respect to a time interval beginning when the video processing system is initially energized.

In accordance with a feature of the invention, a storage element of the AKB system is precharged to a suitable value to reduce the amount of time required for the AKB system to initially achieve correct biasing.

In accordance with another feature of the invention, the storage time constant of the AKB system is reduced for a given interval after the system is initially energized, to reduce the amount of time required for the AKB system to initially achieve correct biasing.

Figure 1:
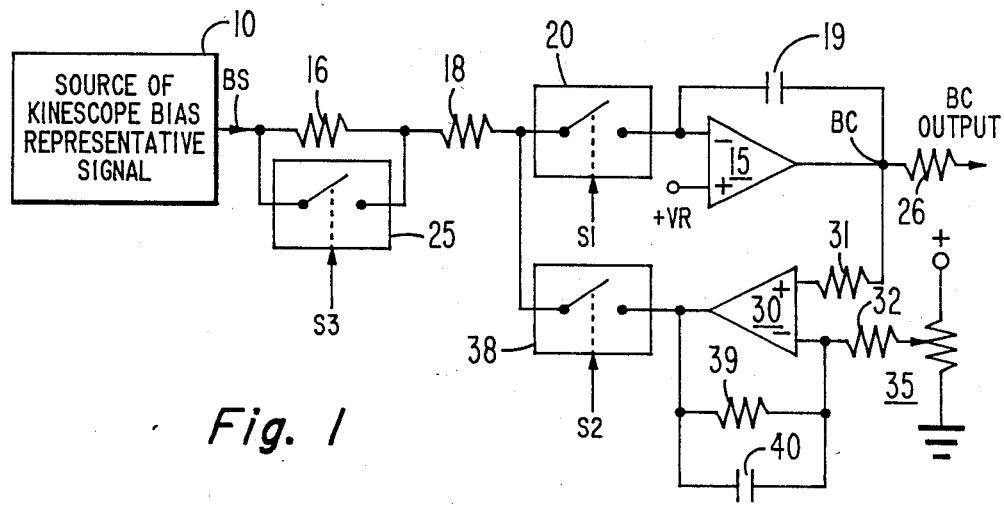
FIG. 1 shows a circuit in accordance with the principles of the present invention, included in an AKB system.

In FIG. 1, a signal BS representative of kinescope bias status is provided from a source 10. The amplitude of signal BS is indicative of whether the kinescope bias with respect to a desired black current bias level is too high, too low, or correct. Signal BS may correspond to a locally induced positive pulse developed during kinescope bias control intervals as described in my U.S. Pat. Nos. 4,263,622 and 4,277,798, and as will be discussed with regard to FIG. 3.

An inverting comparator amplifier 15 receives bias status signal BS at an inverting input (−) via series coupling resistors 16 and 18 and a sampling switch 20 which responds to a sampling timing signal S1. A positive reference voltage +VR is coupled to a non-inverting signal input (+) of amplifier 15. Amplifier 15 comprises an active integrator network together with a feedback capacitor 19 and input coupling resistors 16 and 18. The storage time constant of the integrator network is determined by the values of resistors 16 and 18 and capacitor 19. A normally non-conductive (open) electronic switch 25 is coupled across resistor 16 and responds to a timing signal S3 as will be discussed.

A pre-set circuit includes a comparator amplifier 30 with a non-inverting input coupled to storage capacitor 19 at the output of amplifier 15 via a resistor 31, and an inverting input coupled via a resistor 32 to a source of pre-set potential comprising a potentiometer 35 which is pre-set during the manufacturing process. An electronic switch 38 responds to a timing signal S2 for coupling the output of amplifier 30 to the input signal coupling path for comparator amplifier 15. Resistor 32, a feedback resistor 39 and a feedback capacitor 40 assist to stabilize the pre-set circuit feedback loop including amplifier 30, electronic switch 38, electronic switch 20 and amplifier 15.

The operation of the circuit of FIG. 1 will now be discussed with reference to FIG. 2, which illustrates timing signals S1, S2 and S3.

As seen from FIG. 2, sampling timing signal S1 and pre-set timing signal S2 each exhibit a positive pulse component for a few seconds corresponding to the kinescope warm-up interval, from a time $T_o$ when the system is initially energized to a later time $T_1$ when normal AKB sampling is enabled. Switches 20 and 38 are conductive (ie., closed) in response to the positive pulse components of timing signals S1 and S2 during the warm-up interval, at which time the magnitude of an output bias control signal BC from amplifier 15 is compared to the pre-set voltage from potentiometer 35 by means of comparator amplifier 30. A resulting output voltage from amplifier 30 causes storage capacitor 19 to pre-charge to a value such that output voltage BC substantially equals the pre-set voltage derived from the wiper of potentiometer 35. More specifically, the pre-set voltage applied to the inverting input of amplifier 15 via switches 38 and 20 is compared to reference voltage VR, and capacitor 19 pre-charges to a value such that the input voltage differential of amplifier 15 is minimized by feedback action. This causes a condition of nominally correct kinescope biasing to be achieved during the kinescope warm-up interval, ie., before the kinescope conducts noticeable beam current. The magnitude of output bias control signal BC is related to the magnitude of the voltage across storage capacitor 19. Output control signal BC as coupled to video signal processing circuits via a resistor 26 is used to control the bias of the kinescope, eg., via the associated kinescope driver stage, to produce a kinescope cathode bias condition which is close to the desired black level bias.

Normal AKB sampling operation begins after time $T_1$, wherein sampling signal S1 exhibits periodic positive sampling pulses which recur at the vertical field rate. The sampling pulses encompass approximately two horizontal line intervals, and cause switch 20 to conduct periodically whereby the magnitude of input bias status signal BS is sampled. The magnitude of output bias control signal BC is related to the magnitude of the sampled signal, and causes the kinescope biasing to change until the magnitude of input signal BS as applied to the inverting input of amplifier 15 is substantially equal to reference voltage VR, thereby indicating that correct biasing has been achieved. Switch 38 remains non-conductive in response to signal S2 after time $T_1$ at the end of the warm-up interval.

As a result of the operation of the pre-set circuit including elements 30, 35 and 38, kinescope biasing closely approximates normally expected correct kinescope biasing even before the kinescope begins to conduct noticeable current, because storage capacitor 19 has been pre-charged to close to its normally expected operating value. Once the kinescope has warmed up sufficiently and exhibits normal conduction characteristics at time $T_1$, normal AKB operation is enabled and correct kinescope biasing based on actual kinescope operating conditions is achieved within only a few seconds.

The initial response time of the AKB system is also decreased by means of electronic switch 25, which responds to timing signal S3 for reducing the storage time constant of the AKB system for a short time interval after the system is initially energized. Switch 25 is rendered conductive for approximately one second between times $T_1$ and $T_2$ after the kinescope warm-up interval, thereby short-circuiting input coupling resistor 16, which serves as a charging impedance for capacitor 19, and reducing the AKB storage time constant. The reduced time constant reduces the time required to initially achieve correct kinescope biasing after the kinescope warm-up interval. Switch 25 afterwards returns to a non-conductive state whereby the AKB system exhibits the long time constant required for good noise suppression. A modified time constant can also be produced by switchably modifying the value of storage capacitor 19.

Thus it is seen that the pre-set apparatus including elements 35, 30 and 38, and time constant switch 25 both contribute to increasing the initial response time of the AKB system, and can be used together as described or separately.

After the initial kinescope warm-up interval the kinescope picture appears immediately, with perhaps some black level bias errors which are corrected only a few seconds later, even in an AKB system which for normal operation exhibits a long storage time constant for suppressing low frequency biasing noise. Picture color distortion is desirably avoided because initial AKB bias values closely approximating expected bias values are provided. The described arrangement can be used with various types of AKB systems, including those where the storage capacitor is connected in a shunt configuration with one terminal grounded rather than as shown in FIG. 1.

Figure 3:
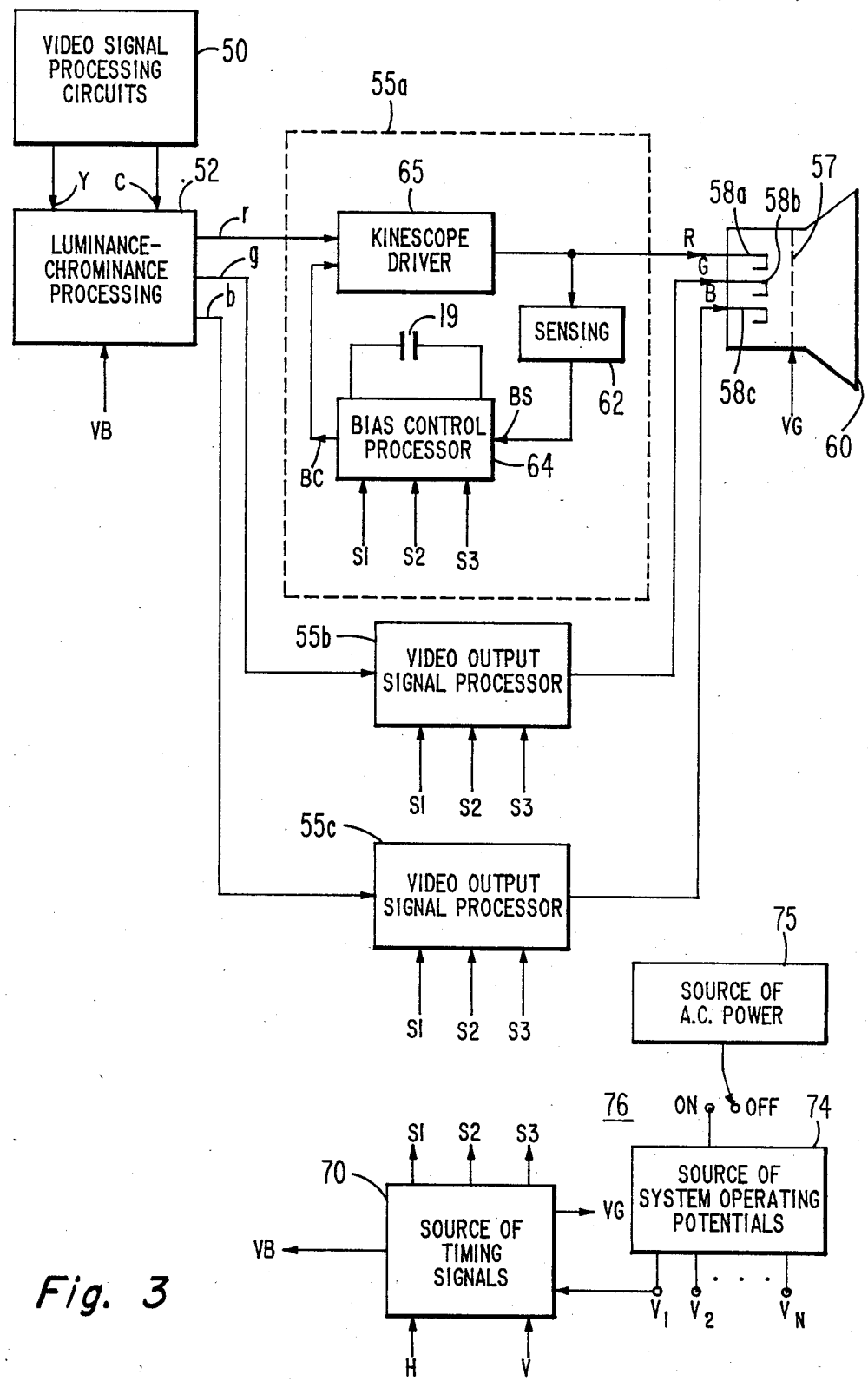
FIG. 3 shows a portion of a color video signal processing system including an AKB system comprising apparatus in accordance with the present invention.

FIG. 3 shows a portion of a color video signal processing system such as a television receiver or a video monitor, including an AKB system incorporating apparatus as shown in FIG. 1.

Video signal processing circuits 50 provide separated luminance (Y) and chrominance (C) components of a composite video signal to a luminance-chrominance signal processor 52. Processor 52 includes luminance and chrominance gain control circuits, DC level setting circuits, color demodulators for developing r-y, g-y and b-y color difference signals, and matrix amplifiers for combining the latter signals with processed luminance signals to provide low level color image representative output signals r, g and b. These signals are respectively amplified by red, green and blue kinescope driver stages included in each of video output signal processors 55a, 55b and 55c, which exhibit similar structure and operation as will be discussed. Processors 55a, 55b and 55c provide high level amplified color image signals R, G and B to respective cathode intensity control electrodes 58a, 58b and 58c of a color kinescope 60. In this instance kinescope 60 is of the self-converging, "in-line" gun type with a commonly energized control grid electrode 57 associated with each of the kinescope electron guns comprising cathode electrodes 58a, 58b and 58c.

As illustrated with respect to video output signal processor 55a, each video output signal processor includes an automatic kinescope bias (AKB) control network for maintaining a desired black level bias for the associated cathode of kinescope 60. The AKB network comprises a sensing network 62, and a bias control signal processor 64 comprising a sampling network with an associated storage capacitor 19 as shown and described in connection with FIG. 1. Sensing network 62 preferably exhibits a high input impedance and provides a bias status output signal (BS) representative of the kindescope cathode black level current conducted during image blanking intervals. Sensing network 62 may also include networks such as clamping networks for establishing a reference level for the representative signal, ie., a level with respect to which the representative signal is measured by circuits in bias control processor 64. Network 62 can employ a resistor voltage divider coupled to the cathode signal path as a sensing circuit, followed by a clamping circuit, as disclosed in my U.S. Pat. Nos. 4,263,622 and 4,277,798.

The representative signal is processed by circuits in network 64, including the sampling circuit shown in FIG. 1, to provide an output bias control signal, ie., a version of bias control signal BC as discussed in connection with FIG. 1, to a kinescope driver amplifier 65. The bias control signal is applied to a bias control input of kinescope driver 65, such as in the manner described in my U.S. Pat. No. 4,263,622, for controlling the kinescope cathode bias so as to maintain a desired level of cathode black current.

The video signal processing system including networks 50, 52, 55a–55c and timing generator 70 is energized in response to plural system operating supply voltages $(+V_1 \ldots +V_N)$ developed by a source of supply potential 74 when source 74 is energized from a source of A.C. power 75 when a viewer operated power switch 76 is placed in the "ON" position. The operating voltages from source 74 include supply voltages for the signal processing circuits of the receiver, as well as operating voltages for kinescope 60 (eg., including filament heater and very high anode voltages).

A source of timing signals 70 associated with the AKB system responds to horizontal line synchronizing rate signals (H) and to vertical field synchronizing rate signals (V), both derived from deflection circuits of the receiver, for generating periodic timing signals VB, VG and S1, S2, S3 which control the operation of the AKB function during period AKB control intervals. Timing signal source 70 is rendered operative in response to supply voltage $V_1$ from source 74, eg., when supply voltage $V_1$ reaches a given level as sensed by a "power-up" voltage level detector associated with source 70. Timing signal source 70 may include digital circuits such as counters, shift registers and logic gates for generating the timing signals in response to input synchronizing signals H and V. The positive pulse component of signals S1 and S2 which occur between times $T_0$ and $T_1$, and the positive pulse component of signal S3 which occurs between times $T_1$ and $T_2$, can be developed by "one-shot" monostable multivibrators responsive to the system being energized at time $T_0$. Each AKB interval begins shortly after the end of each video signal vertical retrace interval within each vertical blanking interval, and encompasses several horizontal line intervals also within the vertical blanking interval and during which video signal image information is absent as shown, for example, in my U.S. Pat. Nos. 4,263,622 and 4,277,798.

Timing signal VB is generated shortly after the end of the vertical retrace interval and exists for the duration of the AKB sensing and sampling interval. This signal is applied to an input blanking control terminal of luminance-chrominance processor 52 for causing the r, g and b outputs of processor 52 to exhibit a DC reference voltage corresponding to black video signal information. This is accomplished by reducing the signal gain of processor 52 to substantially zero via the gain control circuits of processor 52 in response to signal VB, and by modifying the DC level control circuits of processor 52 to produce a black representative reference voltage at the outputs of processor 52.

Figure 2:
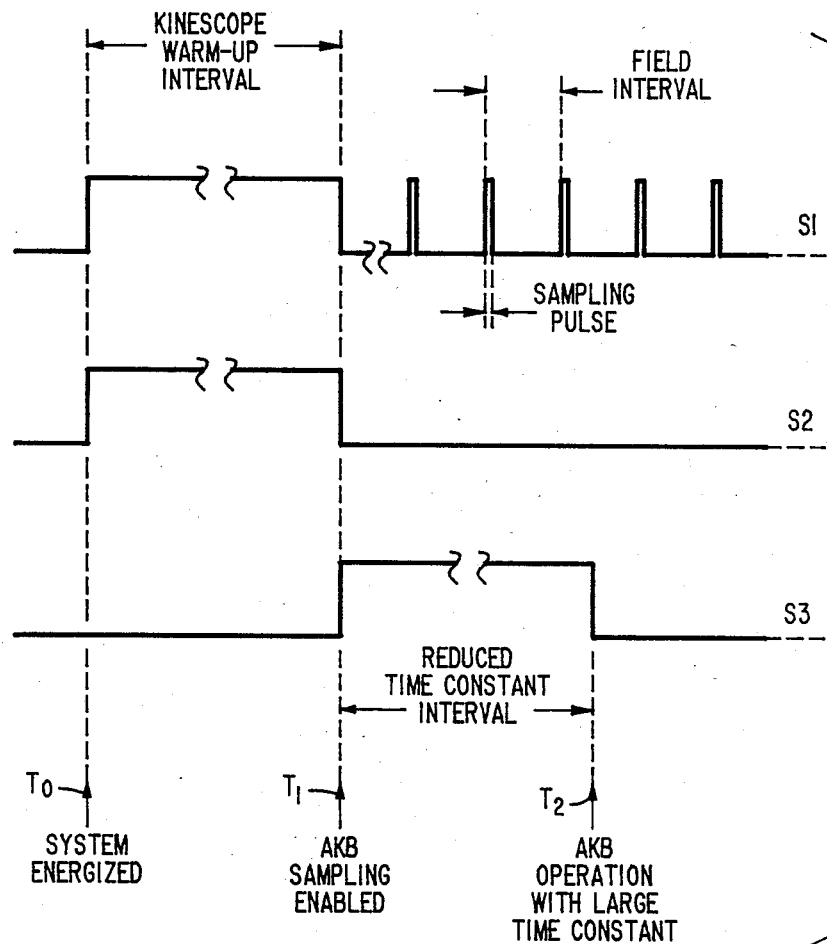
FIG. 2 illustrates timing waveforms associated with the operation of the circuit of FIG. 1.

Each field rate sampling pulse component of timing signal S1, as shown in FIG. 2, occurs during the AKB operating interval shortly after the end of the vertical retrace interval and enables the sampling circuit in processor 64 to operate for developing an output bias control signal representative of the magnitude of the kinescope black current. Timing signal VG, a positive grid drive pulse, is developed during a prescribed portion of the AKB interval (e.g., comprising two horizontal line intervals within the vertical blanking interval) and is coupled to control grid 57 of kinescope 60.

During each AKB interval, positive pulse VG forward biases grid 57, thereby causing the electron gun comprising cathode 58a and grid 57 to increase conduction. In response to grid pulse VG, a similarly phased, positive current pulse appears at cathode 58a during the grid pulse interval. The amplitude of the cathode output current pulse is proportional to the level of cathode black current conduction (typically a few microamperes). The induced cathode output pulse is sensed by network 62 to produce bias status signal BS which is sampled by processor 64 to develop an output bias control signal BC for application to kinescope driver 65 via suitable coupling circuits. With reference to FIG. 1, if the magnitude of the induced cathode output pulse as it appears at the inverting input of comparator amplifier 15 substantially equals reference voltage VR, corresponding to a correct black level bias condition, the voltage stored across capacitor 19 does not change and the bias of kinescope driver 65 and of cathode 58a likewise remain unchanged. Deviations of the magnitude of the cathode pulse from the "correct" level result in a differential signal at the inputs of amplifier 15, whereby the voltage across capacitor 19 and the magnitude of associated bias control signal BC change with a sense for causing the bias of driver 65 to change in a direction for producing a correct cathode bias condition.

What is claimed is:

1. In a video signal processing system including an image display device for displaying an image in response to image representative video signals applied thereto, apparatus comprising:
    means for energizing said system;
    bias control means coupled to said display device for automatically controlling a bias condition of said display device to maintain a desired bias condition for said display device; and
    enabling means coupled to said bias control means and to said energizing means and responsive to the initial energization of said system for reducing the time otherwise required for said bias control means to initially achieve said desired bias condition with reference to the time at which said system is initially energized.

2. Apparatus according to claim 1, wherein
    said bias control means comprises signal storage means determinative of an operating time constant of said bias control means; and
    said enabling means causes said storage means to exhibit a pre-set initial signal storage condition.

3. Apparatus according to claim 2, wherein said storage means stores a signal representative of the bias condition of said display device.

4. Apparatus according to claim 3, wherein said display device corresponds to a kinescope having a cathode electrode; and
said storage means comprises a capacitor for storing a voltage representative of a black current level conducted by said cathode electrode.

5. Apparatus according to claim 1, wherein said video signal processing system corresponds to a video monitor.

6. Apparatus according to claim 1, wherein said bias control means comprises a time constant network determinative of an operating time constant of said bias control means; and
said enabling means is coupled to said time constant network for reducing the time constant thereof over a given interval between said time said system is initially energized and a later time.

7. Apparatus according to claim 6, wherein said time constant network includes a resistance and a capacitance; and
said enabling means modifies the value of said resistance during said given interval to produce said reduced time constant.

8. Apparatus according to claim 7, wherein said capacitance stores a voltage representative of the bias condition of said display device; and
said resistance corresponds to a charging impedance for said capacitance.

* * * * *